United States Patent [19]
Chang

[11] Patent Number: 6,069,907
[45] Date of Patent: May 30, 2000

[54] LASER DIODE PUMPED SOLID STATE LASER AND METHOD USING SAME

[75] Inventor: Samuel Chang, Arcadia, Calif.

[73] Assignee: Olive Tree Technology, Inc., Arcadia, Calif.

[21] Appl. No.: 09/139,732

[22] Filed: Aug. 25, 1998

Related U.S. Application Data

[63] Continuation of application No. 08/808,579, Feb. 28, 1997, Pat. No. 5,875,206
[60] Provisional application No. 60/025,889, Sep. 10, 1996.

[51] Int. Cl.[7] .......................... H01S 3/091; G01D 15/10
[52] U.S. Cl. ......................... 372/75; 372/43; 372/69; 372/70; 372/71; 372/34; 372/101; 346/107.1; 346/107.6
[58] Field of Search ............................... 372/34, 43, 69, 372/70, 71, 75, 101, 7, 23, 35, 36, 39, 40, 50; 346/76 L, 76 R, 76 PH, 33 A, 107.1, 107.6

[56] References Cited

U.S. PATENT DOCUMENTS

| | | | |
|---|---|---|---|
| 4,827,485 | 5/1989 | Scerbak et al. | 372/107 |
| 4,942,586 | 7/1990 | Lai | 372/68 |
| 4,947,402 | 8/1990 | Kane | 372/70 |
| 5,076,678 | 12/1991 | Grossman et al. | 359/710 |
| 5,081,637 | 1/1992 | Fan et al. | 372/72 |
| 5,103,457 | 4/1992 | Wallace et al. | 372/92 |
| 5,181,214 | 1/1993 | Berger et al. | 372/34 |
| 5,235,605 | 8/1993 | Rines et al. | 372/20 |
| 5,235,610 | 8/1993 | Finch et al. | 372/92 |
| 5,299,222 | 3/1994 | Shannon et al. | 372/75 |
| 5,329,539 | 7/1994 | Pearson et al. | 372/36 |
| 5,351,259 | 9/1994 | Ishimori et al. | 372/75 |
| 5,455,838 | 10/1995 | Heritier et al. | 372/75 |
| 5,689,522 | 11/1997 | Beach | 372/75 |
| 5,748,664 | 5/1998 | Dunn et al. | 372/75 |
| 5,875,206 | 2/1999 | Chang | 372/75 |

OTHER PUBLICATIONS

U.S. Patent Abstract No. 5,546,222, Henry Plaessman, et al; "Multi–pass Light Amplifier".
U.S. Patent Abstract No. 5,546,188, Richard J. Wangler, et al; "Intelligent Vehicle Highway System Sensor and Method".
U.S. Patent Abstract No. 5,424,680, Moshe Nazarathy, et al; "Predistorter for High Frenquency Optical Communications Device".
U.S. Patent Abstract No. 5,420,878, Thomas J. Kane, et al; "Production of Laser Light with Controllable Atmospheric Absorption".
U.S. Patent Abstract No. 5,371,581, Richard J. Wangler, et al; "Helicopter Obstacle Warning System".
U.S. Patent Abstract No. 5,345,457, Henry H. Zenzie, et al; "Dual Wavelength Laser System With Intracavity Sum Frequency Mixing".
U.S. Patent Abstract No. 5,329,539, Leonard P. Pearson, et al; "Efficient Laser Configuration".

(List continued on next page.)

*Primary Examiner*—Brian Healy
*Attorney, Agent, or Firm*—Oblon, Spivak, McClelland, Maier & Neustadt, P.C.

[57] ABSTRACT

A solid state laser, comprising (a) a resonator, (b) at least one laser diode array for side pumping said resonator, and (c) at least one fan-out-covering optical system, between said resonator and said at least one laser diode array, does not suffer from thermal problems and provides a high quality beam. The solid state laser may be air cooled.

28 Claims, 10 Drawing Sheets

OTHER PUBLICATIONS

U.S. Patent Abstract No. 5,321,490, Robert A. Olson, et al; "Active Near–Field Object Sensor and Method Employing Object Classification Techniques".

U.S. Patent Abstract No. 5,299,222, David Shannon, et al; "Multiple Diode Laser Stack for Pumping Solid–State Laser".

U.S. Patent Abstract No. 5,282,072, Moshe Nazarathy, et al, "Shunt–Expansive Predistortion Linearizers for Optical Analog Transmitters".

U.S. Patent Abstract No. 5,278,423, Richard J. Wangler, et al; "Object Sensor and Method for use in Controlling an Agricultural Sprayer".

U.S. Patent Abstract No. 5,253,309, Moshe Nazarathy, et al; "Optical Distribution of Analog and Digital Signals Using Optical Modulators with Complementary Outputs".

U.S. Patent Abstract No. 5,237,584, David Shannon, et al; "High Power Optical Cavity for End–Pumped Solid State Laser".

U.S. Patent Abstract No. 5,235,610, Andrew Finch, et al; "Prism Gain Module and Method".

U.S. Patent Abstract No. 5,235,605, Glen A. Rines, et al; "Solid State Laser".

U.S. Patent Abstract No. 5,226,051, Melvin Chan, et al; "Laser Pump Control for Output Power Stabilization".

U.S. Patent Abstract No. 5,216,729, Josef Berger, et al; "Active Alignment System for Laser to Fiber Coupling".

U.S. Patent Abstract No. 5,206,697, William C. Schwartz; "Tunable Laser Rangefinder and Method".

U.S. Patent Abstract No. 5,181,214, Josef Berger, et al; "Temperature Stable Solid–State Laser Package".

U.S. Patent Abstract No. 5,177,764, Alan C. Nilsson; "Unidirectional, Planar Ring Laser with Birefringence".

U.S. Patent Abstract No. 5,161,044, Moshe Nazarathy, et al; "Optical Transmitters Linearized by Means of Parametric Feedback".

U.S. Patent Abstract No. 5,148,444, Josef Berger; "Tunable Single–Frequency Ring Laser".

U.S. Patent Abstract No. 5,130,995, William M.. Grossman, et al; "Laser with Brewster Angled–Surface Q–Switch Aligned Co–Axially".

U.S. Patent Abstract No. 5,103,457, Richard W. Wallace, et al; "Elliptical Mode Cavities for Solid–State Lasers Pumped by Laser Diodes".

U.S. Patent Abstract No. 5,009,486, Madhu A. Acharekar, et al; "Frequency Stabilized Ho:YAG Laser".

U.S. Patent Abstract No. 5,076,678, William M. Grossman, et al; "Laser Diode Light Imaging Optics".

U.S. Patent Abstract No. 5,029,179, James Harrison, "Laser Apparatus and Method for Simple Conversion Between Standing–Wave and Ring Resonator Configurations".

U.S. Patent Abstract No. 4,947,402, Thomas J. Kane; "Two–Mirror Shaping of a Non–Circular Optical Pumping Beam and Lasers Using Same".

U.S. Patent Abstract No. 4,829,532, Thomas J. Kane; "Piezo–Electrically Tuned Optical Resonator and Laser Using Same".

U.S. Patent Abstract No. 4,827,485, David G. Scerbak, et al; "Diode Pumped Solid State Laser".

U.S. Patent Abstract No. 4,752,931, John A. Dutcher, et al; "Pulse Shaper for an Electro–Optically Q–Switched Seeded Laser".

U.S. Patent Abstract No. 4,734,912, David G. Scerbak, et al; "Laser Diode End Pumped Nd:YAG Single Mode Laser".

U.S. Patent Abstract No. 5,574,740, David E. Hargis, et al; "Deep Blue Microlaser".

U.S. Patent Abstract No. 5,572,543, Stefan Heinemann, et al; "Laser System With a Micro–Mechanically Moved Mirror".

U.S. Patent Abstract No. 5,561,684, Danny W. Martin; "Laser Diode Pumped Solid State Laser Construction".

U.S. Patent Abstract No. 5,548,608, Tong Zhang; "Laser head and Telescopic Cavity for Diode–Pumped Solid–State Lasers".

U.S. Patent Abstract No. 5,526,372, Georg Albrecht, et al; "High Energy Bursts From a Solid State Laser Operated in the Heat Capacity Limited Regime".

U.S. Patent Abstract No. 5,521,932, Larry R. Marshall; "Scalable Side–Pumped Solid–State Laser".

U.S. Patent Abstract No. 5,469,454, Peter J. Delfyett, Jr.; "Mode Locked Laser Diode in a High Power Solid State Regenerative Amplifier and Mount Mechanism".

U.S. Patent Abstract No. 5,448,582, Nabil M. Lawandy; "Optical Sources Having a Strongly Scattering Gain Medium Providing Laser–Like Action".

U.S. Patent Abstract No. 5,446,750, Hisashi Ohtsuka, et al; "Laser Diode Pumped Solid Laser".

U.S. Patent Abstract No. 5,394,427, Ted S. McMinn, et al; "Housing for a Slab Laser Pumped by a Close–Coupled Light Source".

U.S. Patent Abstract No. 5,388,112, Leon Esterowitz, et al; "Diode–Pumped, Continuously Tunable, 2.3 Micron CW Laser".

U.S. Patent Abstract No. 5,381,427, Doerte Wedekind, et al; "Single Mode Laser".

U.S. Patent Abstract No. 5,367,377, John P. Rahn; "Solid State Split–Gain Multioscillator Ring Laser Gyroscope".

U.S. Patent Abstract No. 4,749,842, Thomas J. Kane; "Ring Laser and Method of Making Same".

U.S. Patent Abstract No. 5,317,585, Eduard Gregor; "Laser Reflecting Cavity With ASE Suppression and Heat Removal".

U.S. Patent Abstract No. 5,315,608, Hong K. Choi; "Holmium–Doped Solid State Optically Pumped Laser".

U.S. Patent Abstract No. 5,308,737, Richard E. Bills; "Laser Propulsion Transfer using Black Metal Coated Substrates".

U.S. Patent Abstract No. 5,307,365, Eddy A. Stappaerts, et al; "Cavity Pumped, Solid State Lasers".

U.S. Patent Abstract No. 5,297,156, David A. G. Deacon; "method and Apparatus for dual Resonant Laser Up conversion".

U.S. Patent Abstract No. 5,272,710, David S. Sumida, et al; "Stress–Free mounting and Protection of Liquid–Cooled Solid–State Laser Media".

U.S. Patent Abstract No. 5,265,113, Thorsteinn Halldrsson, et al; "Integrated Microsystem".

U.S. Patent Abstract No. 5,256,164, Aram Mooradian; "Method of Fabricating a Microchip Laser".

U.S. Patent Abstract No. 5,241,315, James D. Spinhirne; "Micro Pulse Laser Radar".

U.S. Patent Abstract No. 5,218,610, George J. Dixon; "Tunable Solid State Laser".

U.S. Patent Abstract No. 5,200,966, Leon Esterowitz, et al; "Resonantly Pumped, Erbium–Doped, GSGG, 2.8 Micron, solid State Laser With Energy Recycling and High Slope Efficiency".

U.S. Patent Abstract No. 5,187,714, Yoji Okazaki, et al; "Laser–Diode–Pumped Solid–State Laser".

U.S. Patent Abstract No. 5,172,388, David C. Long, et al; "Method and Apparatus for an Increased Pulse Repetition Rate for a CW Pumped Laser".

U.S. Patent Abstract No. 5,170,409, John L. Nightingale, et al; "Laser Resonator Assembly".

U.S. Patent Abstract No. 5,146,468, Hiroshi Kimura, et al; "Gas Doping of Solids by Crystal Growth".

U.S. Patent Abstract No. 5,142,542, George J. Dixon; "Signal–Resonant Intracavity Optical Frequency Mixing".

U.S. Patent Abstract No. 5,139,609, Fenny A. Fields, et al; "Apparatus and Method for Longitudinal Diode Bar Pumping of Solid State Lasers".

U.S. Patent Abstract No. 5,128,954, Hiroshi Kimura, et al; "Impregnation of a Solid From the Gas Phase".

U.S. Patent Abstract No. 5,118,945, Erich Winschuh, et al; "Photothermal Test Process, Apparatus for Performing the Process and Heat Microscope".

U.S. Patent Abstract No. 5,105,430, David C. Mundinger, et al; "Thin Planar Package for Cooling an Array of Edge–Emitting Laser Diodes".

U.S. Patent Abstract No. 5,105,429, David C. Mundinger, et al; "Modular Package for cooling a Laser Diode Array".

U.S. Patent Abstract No. 5,077,751, Shuetsu Kudo, et al; "Diode Laser Pumped Solid State Laser".

U.S. Patent Abstract No. 5,031,182, Douglas W. Anthon, et al; "Single–Frequency Laser of Improved Amplitude Stability".

U.S. Patent Abstract No. 5,029,335, James H. Fisher; "Heat Dissipating Device for Laser Diodes".

U.S. Patent Abstract No. 5,027,361, William J. Kozlovsky; "Efficient Laser Harmonic Generation Employing a Low--Loss External Optical Resonator".

U.S. Patent Abstract No. 5,022,043, Ralph R. Jacobs; "High Power Diode–Pumped Solid State Laser With Unstable Resonator".

U.S. Patent Abstract No. 5,022,033, Lloyd A. Hackell, "Ring Laser Having An Output at a Single Frequency".

U.S. Patent Abstract No. 5,014,279, Leon Esterowitz, et al; "Laser Diode Pumped, Erbium–Doped, Solid State Laser With High Slope Efficiency".

U.S. Patent Abstract No. 5,003,548, David P, Bour, et al; "High Power (1,4 W)AlGaInP Graded–Index Separate Confinement Heterostructure Visible (.Lambda.–658 nm) Laser".

U.S. Patent Abstract No. 4,979,180, Arthur M. Muncheryan; "Modular Interchangeable Laser System".

U.S. Patent Abstract No. 4,969,150, Leon Esterowitz; "Tunable, Continuous Wave, Thulium–Doped, Solid State Laser".

U.S. Patent Abstract No. 4,965,803, Leon Esterowitz, et al; "Room–Temperature, Laser Diode–Pumped, Q–Switched, 2 Micron, Thulium–Doped, Solid State Laser".

U.S. Patent Abstract No. 4,953,166, Aram Mooradian; "Microchip Laser".

U.S. Patent Abstract No. 4,949,346, Jerry W. Kuper, et al; "Conductively Cooled, Diode–Pumped Solid–State Slab Laser".

U.S. Patent Abstract No. 4,933,947, Douglas W. Anthon, et al; "Frequency Conversion of Optical Radiation".

U.S. Patent Abstract No. 4,914,663, Santanu Basu, et al; "Generation of Short High Peak Power Pulses from an Injection Mode–Locked Q–Switched Laser Oscillator".

U.S. Patent Abstract No. 4,901,330, Thomas Wolfram, et al; "Optically Pumped Laser".

U.S. Patent Abstract No. 4,890,289, Santanu Basu, et al; "Fiber Coupled Diode Pumped Moving Solid State Laser".

U.S. Patent Abstract No. 4,879,723, George J. Dixon, et al; "Intracavity Generation of Coherent Optical Radiation of Optical Mixing".

U.S. Patent Abstract No. 4,847,851, George J. Dixon; "Butt–Coupled Single Transverse Mode Diode Pumped Laser".

U.S. Patent Abstract No. 4,808,789, Hrand M. Muncheryan; "Diode–Pumped–Laser Instrumentation System".

U.S. Patent Abstract No. 4,701,928, Tso Y. Fan, et al; "Diode Laser Pumped Co–Doped Laser".

U.S. Patent Abstract No. 4,575,854, Danny W. martin; "Uncooled YAG Laser".

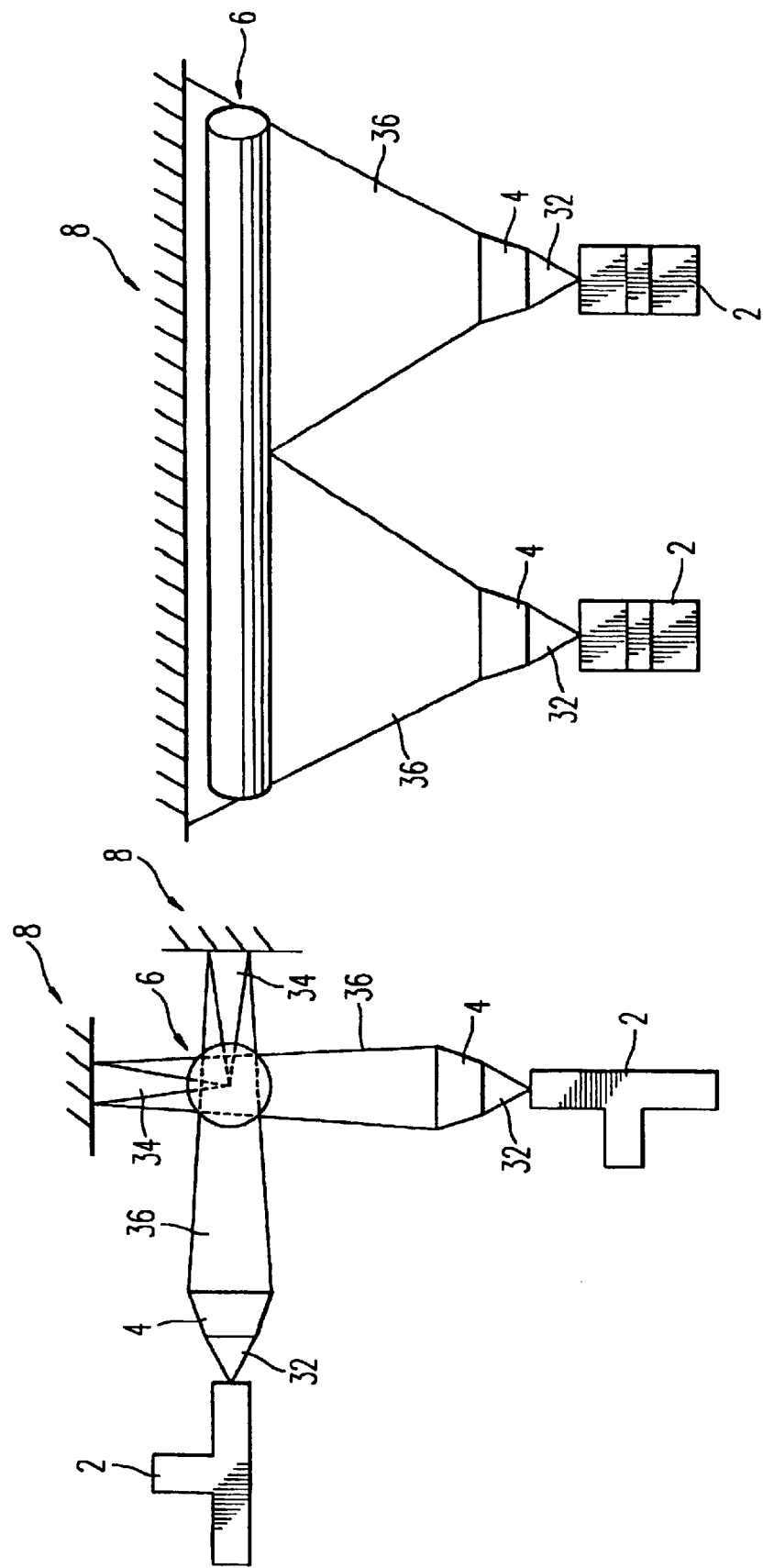

LASER DIODE PUMPED SOLID STATE LASER AND METHOD USING SAME

This application is a Continuation of application Ser. No. 08/808,579, filed on Feb. 28, 1997, pending, which was filed from Provisional Application No. 60/025,889, filed on Sep. 10, 1996.

BACKGROUND OF THE INVENTION

1. Field of the Invention

The present invention relates to a solid state laser pumped by laser diodes.

2. Discussion of the Art

A laser diode pumped solid state laser produces laser light by pumping a resonator of a laser material, such as Nd:YAG or Nd:YLF, with light from laser diodes, exciting atoms or molecules within the laser material. The ends of the laser material may be polished and covered with a highly reflective coating, or external reflectors may be used, to form an oscillator cavity, reflecting light back and fourth through the laser material. This provides the feedback for optical amplification, resulting in a beam of laser light. These types of solid state lasers are well known to those of ordinary skill in the art, and are described in "Lasers", *Encyclopedia of Chemical Technology,* Kirk-Othmer, $4^{th}$ ed., vol 15, pp. 1–50, (John Wiley and Sons, 1995) and "Lasers (Coherent Sources)", J. E. Miller and D. J. Horowitz, *Electronics Engineers' Handbook,* $3^{rd}$ Edition, D. G. Find and D. Christiansen, ed., pp. 11-11 to 11-41, (McGraw-Hill, 1989).

Laser diodes emit a light beam with an elliptical shape. A laser diode array is illustrated in FIG. 17. A laser diode array 2 contains many individual laser diodes; as many as 100 is not unusual. Each diode emits its own laser beam 42 from the emitting surface 40, which together form an elliptical light beam 32. The laser beam 32 fans out more rapidly in the vertical direction 44, typically 20–50°, but only 8–15° in the horizontal direction 46. Since only light which impinges on the laser material (resonator) can excite the atoms or molecules in the laser material, the laser diode array is placed as close as possible to the laser material, in order to avoid losing any light.

FIGS. 1 and 2 illustrate a conventional laser diode pumped solid state laser having a side (perpendicular) pumping configuration. The axis which is aligned with the resonator cavity, the laser axis, is the long axis of the resonator in FIG. 2, or the long axis perpendicular to the direction of illumination by the laser diode arrays. Omitted from this figure (as well as most of the figures) are end mirrors and optional Q-switches which define the resonator cavity. In FIG. 1 a slab shaped resonator is pumped by two semiconducting laser diode arrays 2 and 2. Antireflective coatings 28 and 28, on the surface of the resonator facing the laser diode arrays prevents loss by reflection of the pumping laser light. As the light passes through resonator 12 it excites atoms or molecules in the laser material. Highly reflective coatings 14 and 14 then reflect any light which is not absorbed back through the resonator 12.

FIG. 2A illustrates a rod shaped resonator 6 pumped by a laser diode array 2. An exploded view of two alternative configurations are shown in FIGS. 2B and 2C. In a first configuration, the surface of the resonator 6 is coated with an antireflective coating 28. The laser beam 32 generated by the laser diode array 2 passes into the resonator 6 and is reflected back by the highly reflective coating 14. In FIG. 2C the entire resonator 6 is covered by an antireflective coating 28, and the laser beam 32 is reflected back after it exits the resonator by a concave mirror 30.

The light from the laser diode arrays is not completely absorbed through the thickness of the laser material. To most efficiently use the light from the laser diode arrays, it is necessary to reflect the laser diode light which escapes the laser material opposite the laser diode arrays. Since the beam of light from the laser diode arrays fan out, reflection of this light from a flat mirror results in a large amount of this reflected light not being returned to the resonator. Therefore, the light must be redirected, typically with a concave mirror, which refocuses the light back towards the resonator. If the resonator is in the shape of a round cylinder, this may also be accomplished by coating the surface of the resonator opposite the laser diodes with a highly reflective coating.

The close proximity of the laser diode array to the resonator is problematic. Only a small portion of the resonator is actually illuminated, and hence excited, by the light from the laser diode array. Consequently, only a small fraction of the resonator participates in formation of the laser beam. Furthermore, the heat generated by the laser diode arrays locally heats a portion of the resonator, especially when the laser output power is 10 watts or more. The localized heating degrades beam quality, for example by thermal lensing, resulting in a beam with a varying pointing direction, unstable energy profile and variable spot size. In addition, the ends of the resonator are typically polished and coated with an antireflective coating, and thermal effects can distort the flatness of this polished end, causing it to act like a lense, changing the optical characteristics of the resonator cavity.

The thermal distortion effects in laser diode pumped solid state lasers necessitate complex cooling systems. For example, closed loop water cooling is a requirement in laser diode pumped solid state lasers of 10 watts or more. Water cooling is problematic because of its complexity, and the necessity of adding water to the cooling system. Water cooling will only efficiently cool a portion of the resonator, unless the entire resonator is immersed in the cooling water. Total immersion, however, can interfere with the resonator cavity, requiring very stringent water conditions. Finally, there is also the possibility of leakages, which can result in short circuits and destruction of the entire laser system and any accompanying electronic equipment, making a water cooled system unsuitable for use in printers and other consumer devices.

SUMMARY OF THE INVENTION

Accordingly, one object of this invention is to provide a laser diode pumped solid state laser which does not suffer from thermal problems, and has high beam quality.

Another object of the invention is to provide a laser diode pumped solid state laser which does not require water cooling.

Another object of the invention is to provide a laser diode pumped solid state laser that does not require a concave reflecting surface for reflecting laser diode light back through the laser material.

These and other objects can be obtained with solid state laser, comprising (a) a resonator, (b) at least one laser diode array for side pumping said resonator, and (c) at least one fan-out-covering optical system, between said resonator and said at least one laser diode array.

These and other objects can also be obtained with a solid state laser, comprising (a) a resonator, (b) a laser diode array for side pumping said resonator, (c) an air cooler, and (d) an air flow controller.

These and other objects can also be obtained with a method of generating a laser beam, comprising generating laser light from at least one laser diode array; and passing said laser light through at least one fan-out-covering optical system, thereby side pumping a resonator.

These and other objects can also be obtained with a method of generating a laser beam, comprising generating laser light from at least one laser diode array; side pump a resonator with said laser light; and moving cooled air across said resonator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 shows an embodiment of the laser of the present invention which has sets of laser diodes orthogonal to each other.

FIG. 9 shows an embodiment of the laser of the present invention which has sets of laser diodes parallel to each other.

DETAILED DESCRIPTION OF THE INVENTION

Figure 1:
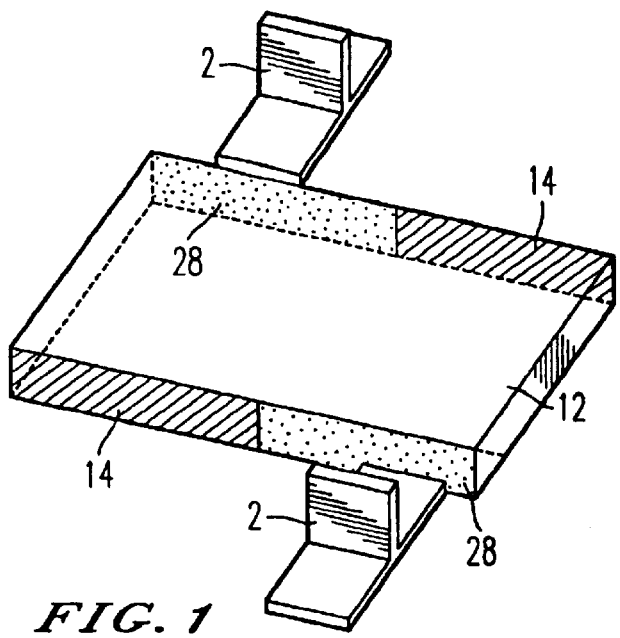
FIG. 1 illustrates a first configuration of a conventional laser diode pumped solid state laser.
Figure 2A:
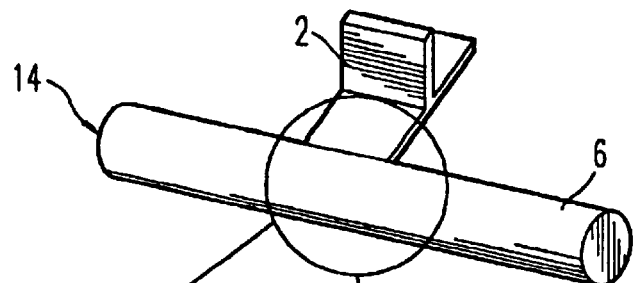
FIGS. 2a–c illustrates a second configuration of a conventional laser diode pumped solid state laser, showing two different methods for reflecting light from the laser diode.
Figure 2B:
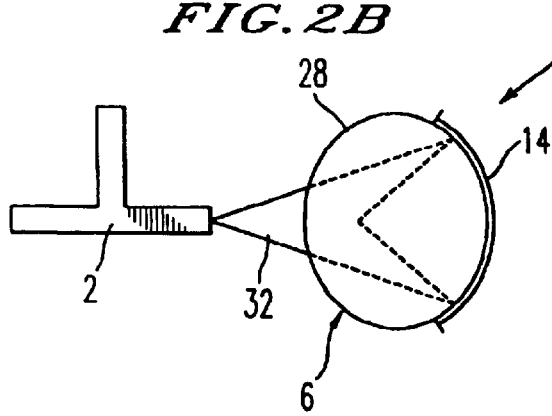
Figure 2C:
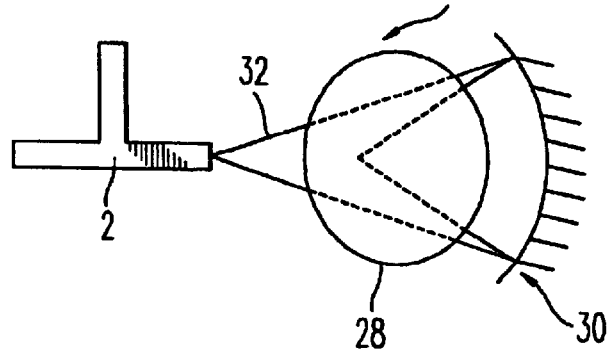
Figure 3:
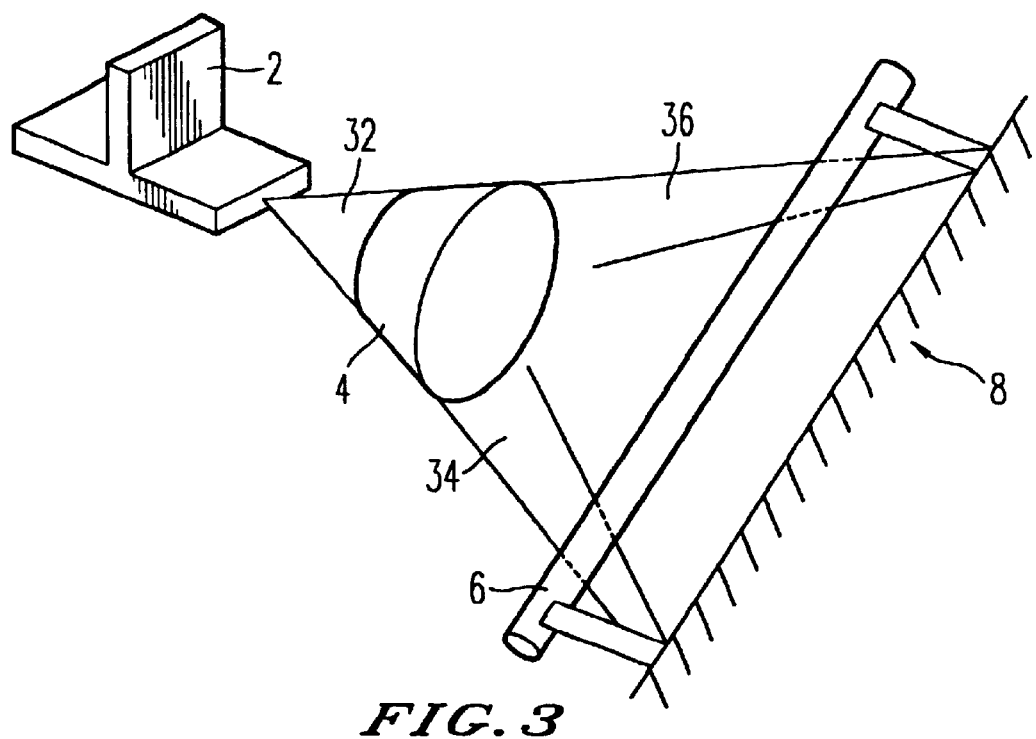
FIG. 3 illustrates one view of a laser of the present invention.
Figure 4:
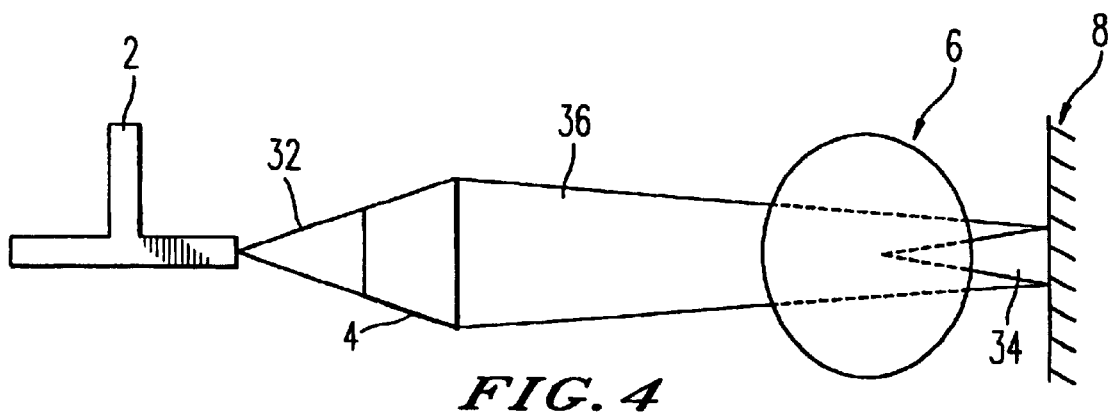
FIG. 4 illustrates a side view of a laser of the present invention.

An embodiment of the invention is shown in FIGS. 3 and 4. Illustrated in FIG. 3 is an angled view of a laser diode array 2, resonator 6, fan-out-covering optical system 4 between the laser diodes and the resonator, and a flat mirror 8. In this embodiment the elliptical light beam 3 from the laser diode array 2 passes through the fan-out-covering optical system 4. The fan-out-covering optical system 4 changes the elliptically spreading beam 32 from the laser diode array and shapes the beam into a fan-out wedge shape, forming a fan-out-covering beam 36. In the direction along the main axis of the resonator, the beam 36 fans out to cover almost the full length of the resonator 6. In the direction perpendicular to the main axis of the resonator 6, the beam 36 is focused to a point located behind the mirror 8.

FIG. 4 shows a side view of this same system, illustrating how the fan-out-covering optical system focuses the beam in the direction perpendicular to the main axis of the resonator. The fan-out-covering beam 36 is focused to a point behind the mirror 8, which may be the same distance from the mirror 8 as the approximate center of the resonator 6. This focusing ensures that the beam covers as large a portion of the resonator as possible, and that all the light that is reflected, as reflected beam 34, passes back through the resonator 6.

Figure 6:
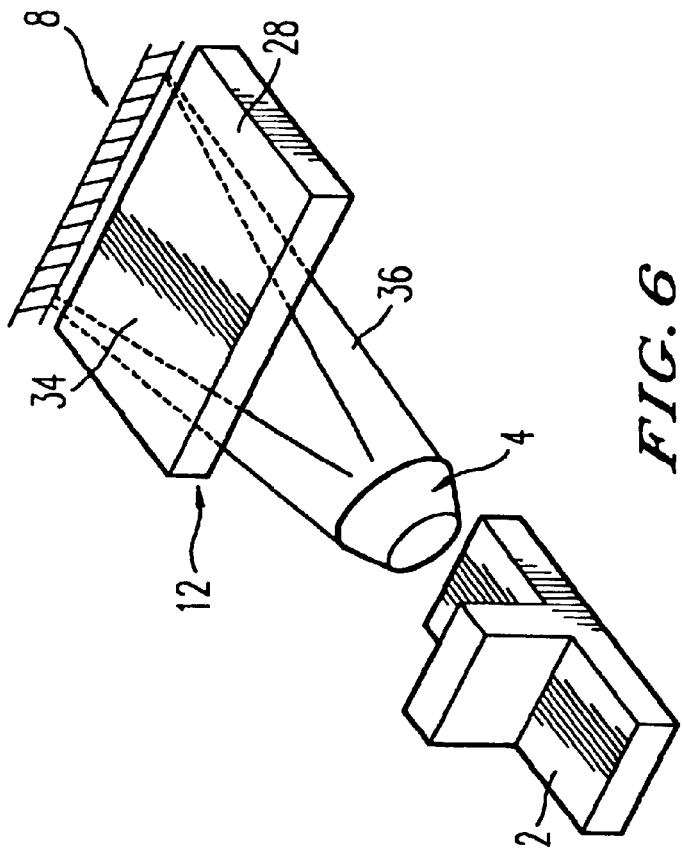
FIG. 6 illustrates an embodiment of the present invention having a slab-shaped resonator.
Figure 5:
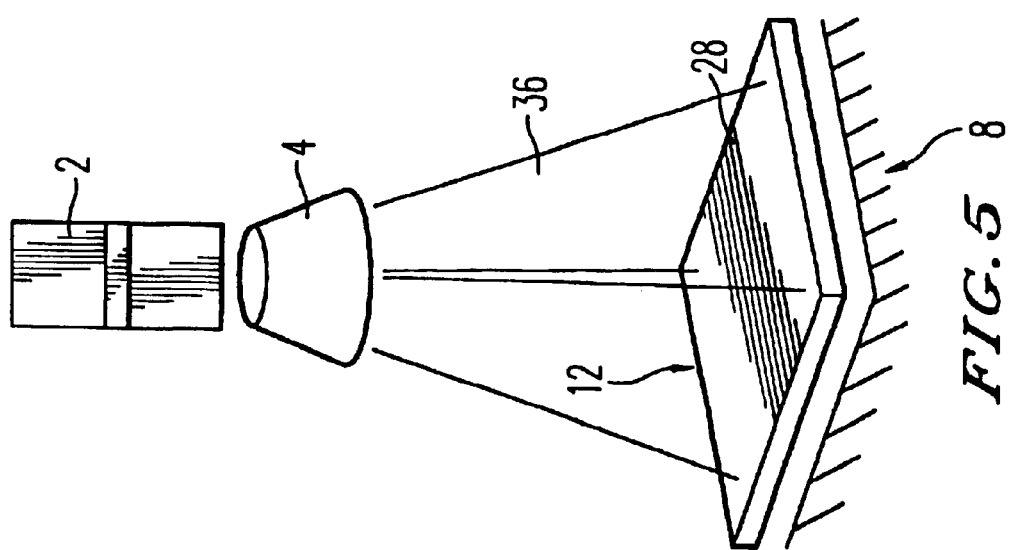
FIG. 5 illustrates an embodiment of the present invention having a slab-shaped resonator.

The resonator used in the present invention may also have a slab shape, as illustrated in FIG. 5 and 6. Laser diode array 2 generates an elliptical beam (omitted for clarity) which passes through the fan-out-covering optical system 4, forming a fan-out-covering beam 36 which fully illuminate the resonator 12. A flat mirror 8 is placed behind the resonator to reflect the light, sending the reflected beam back through the resonator 12. Since the resonator has a slab shape, with a flat surface opposite the laser diode array and fan-out-covering optical system, the surface of the resonator opposite the laser diode array may be covered with a highly reflective coating instead of using a flat mirror. An antireflective coating 28 may cover all surfaces of the resonator 12 which are illuminated by laser light. A slab-shaped resonator can also be illuminated from one narrow side, as illustrated in FIG. 6. FIG. 6 includes the reflected beam 34 in the illustration.

The resonator should be covered with an antireflective coating. This antireflective coating ensures that the light from the laser diode arrays, after passing through the fan-out-covering optical system, enters the resonator without being reflected from the surface of the resonator. In some circumstances, preferably with a slab-shaped resonator, a surface of the resonator may be covered with a highly reflective coating, as a substitute for a flat mirror, rather than an antireflective coating.

Figure 15:
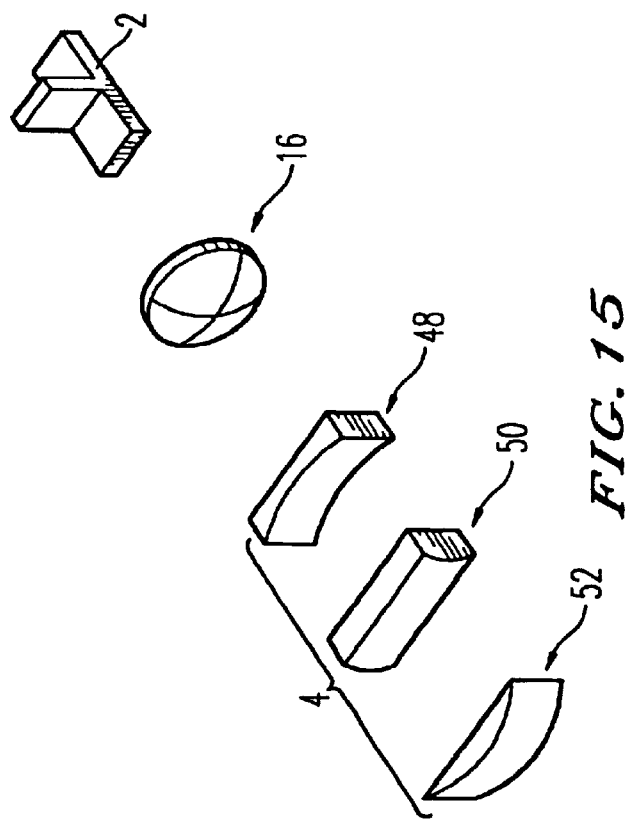
FIG. 15 shows a portion of an embodiment of a laser system of the present invention, including a laser diode array, a collimating lense, and a fan-out-covering optical system.
Figure 17:
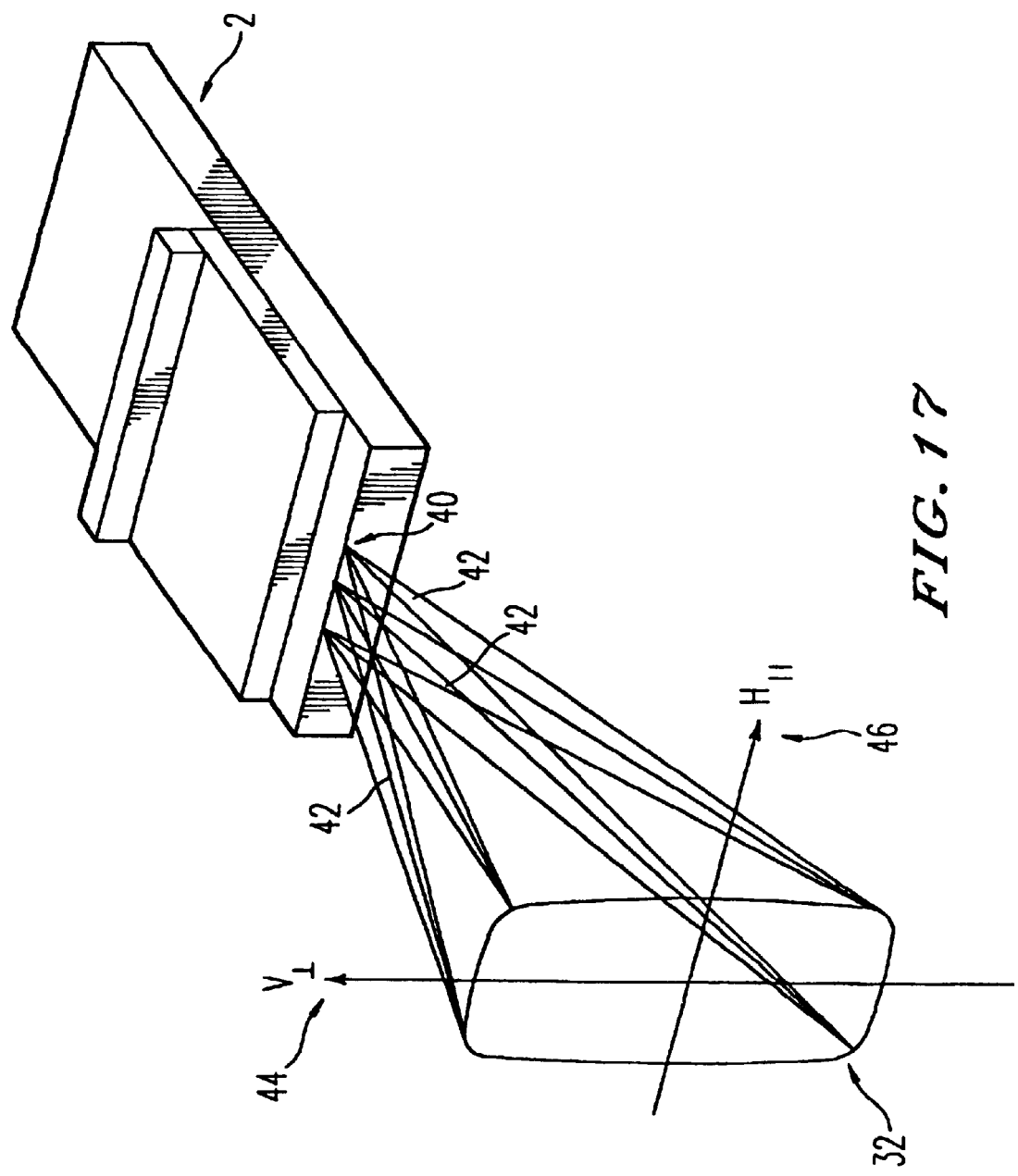
FIG. 17 shows a laser diode array.

Collimating optics may also be used in the present invention. A portion of a laser system of the present invention, including collimating optics 16, is illustrated in FIG. 15. Collimating optics 16 can be used to initially collect the light from the laser diode array 2 and direct it into the fan-out-covering optical system 4. The fan-out-covering optical system in this embodiment includes a horizontal concave cylindrical lense 48, a vertical convex cylindrical lense 50, and a horizontal convex cylindrical lense 52. The collimating optics may be one or more optical lenses, or flat or concave mirrors.

Laser diode arrays may be used to illuminate the resonator from one, two or more directions. FIG. 8 illustrates a rod-shaped resonator 6 illuminated by laser diode arrays 2 and 2 from perpendicular directions. Also includes are two flat mirrors 8 and 8, for reflecting light beams 36 and 36 which pass through the resonator 6 back toward the resonator as reflected beams 34 and 34. Two fan-out-covering optical systems 4 and 4 are used to convert light beams 32 and 32 into fan-out-covering beams 36 and 36. A similar system can be made using a slab resonator, illuminated from above by laser diode arrays, and simultaneously illuminated from the side by laser diode arrays.

Multiple sets of laser diode array may also be used to illuminate the resonator in an in line or parallel fashion, illustrated in FIG. 9. Two sets of laser diode arrays 2 and 2 generate elliptical light beams 32 and 32 which enter two parallel fan-out-covering optical systems 4 and 4, illuminating resonator 6. A single large flat mirror 8 reflects the light back through the resonator.

A more complex system can be used to illuminate a resonator from opposite sides simultaneously, using V-coating which reflect only a narrow range of frequencies of light. V-coatings, also known as dichroic optical coatings, are well known to those of ordinary skill in the art, and are described in U.S. Pat. Nos. 4,827,485 and 5,299,222. For example, a slab resonator may be illuminated from opposing sides, with two different diode laser arrays, each emitting a different frequency of light. Two different V-coating are coated on the face illuminated by the diode laser arrays, with the V-coatings selected to reflect only the light of the diode laser array which illuminated the opposite face of the resonator. Finally, the V-coatings are themselves coated with an antireflective coating. In another embodiment, a rod-shaped resonator with a square cross section can be illuminated from all four side, using two types of laser diode arrays, and two types of V-coatings. This can be extended, by using a rod-shaped resonator have six, eight, or more, faces using two types of laser diode arrays, and two V-coatings.

Figure 10:
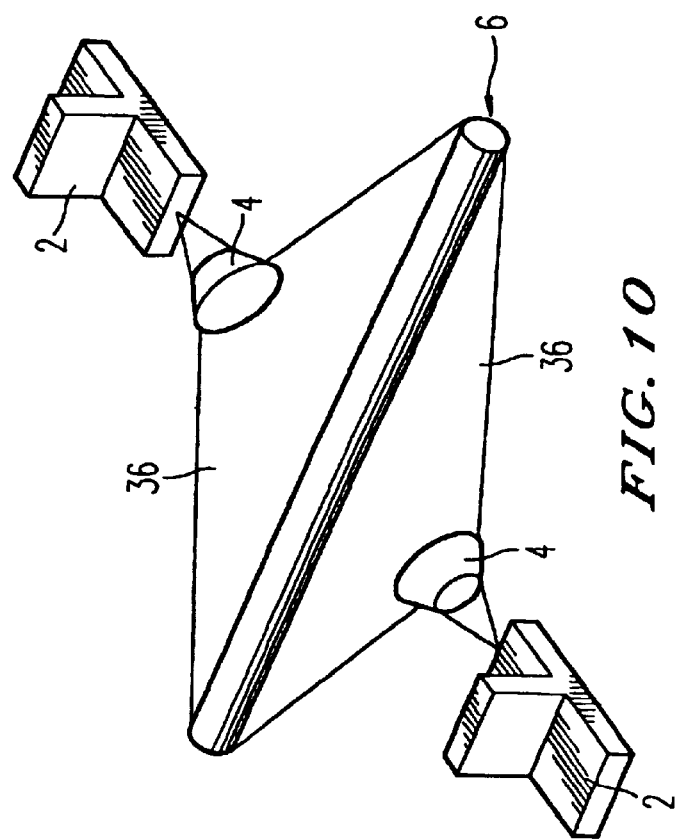
FIG. 10 illustrates a further embodiment of the present invention.

Another arrangement is illustrate in FIG. 10. In this arrangement two sets of laser diode arrays 2 and 2 illuminate a resonator 6 from an angle. The two laser diode arrays 2 and 2 are in different planes. The mirrors have been omitted for clarity.

Figure 11:
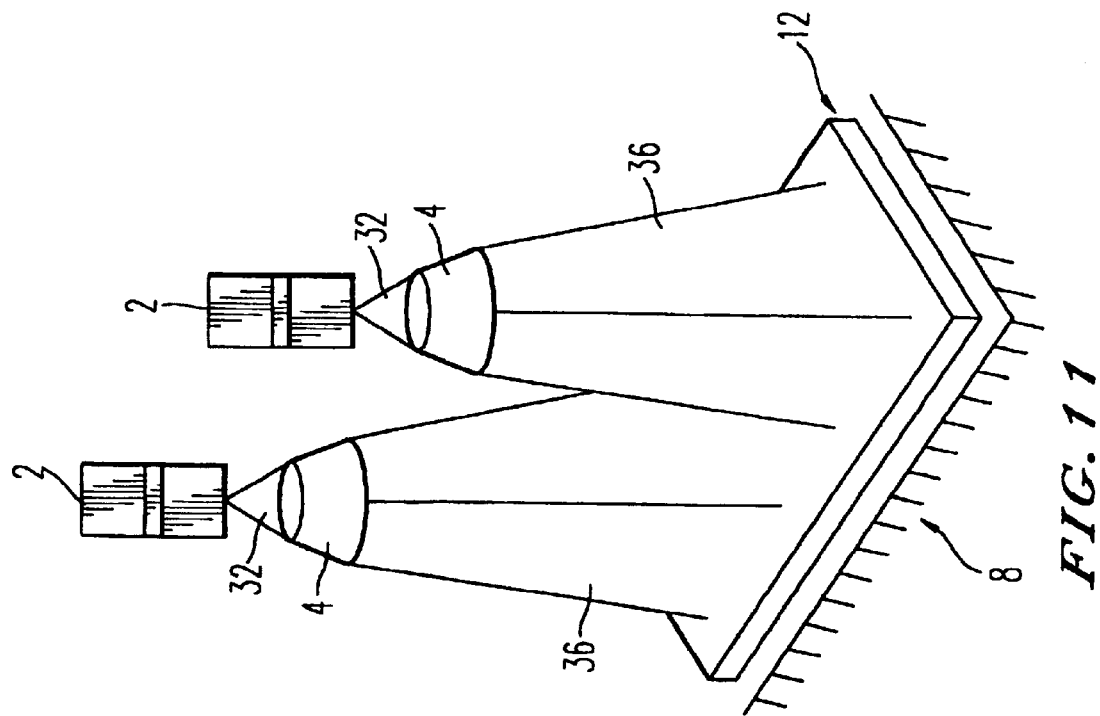
FIG. 11 shows an embodiment of the laser of the present invention with sets of laser diodes parallel to each other.
Figure 12:
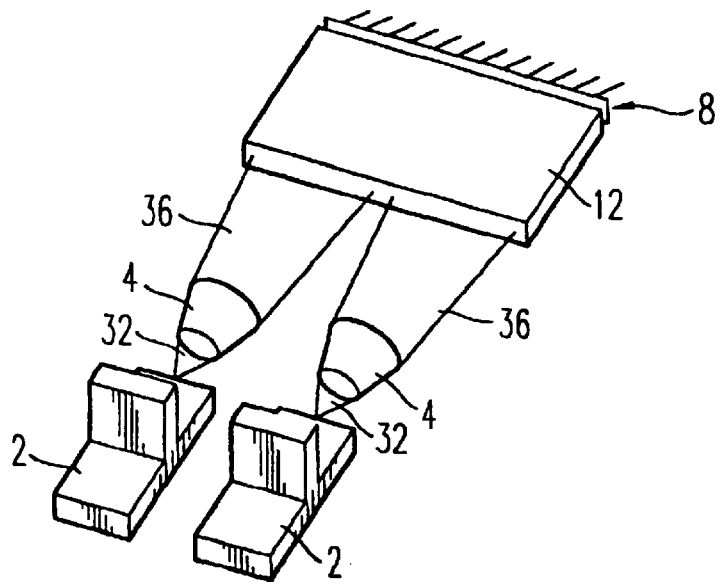
FIG. 12 shows an embodiment of the laser of the present invention with sets of laser diodes parallel to each other.

FIG. 11 illustrates in line laser diode arrays illuminating a slab-shaped resonator from above. FIG. 12 illustrates in line illumination of a slab resonator from the side. Both in line illumination and circling illumination may be combined in a single system.

With a slab-shaped resonator the fan-out-covering optical system above the top and/or bottom flat surface of the slab shapes the laser beam from the laser diode arrays into a cone, with a round or rectangular cross-section, to cover as much of the surface of the resonator as possible. When illuminating a slab-shaped resonator from a narrow side, the fan-out-covering optical system shapes the laser beam from the laser diode array into a fan-out wedge shape. In one direction it fans out to cover almost the full length of the resonator slab edge, while in the other perpendicular direction, the beam is focused through a flat mirror beyond the resonator slab. The mirror is positioned to fold the focus of the laser beam back into the resonator slab.

An advantage of the present invention is that the entire resonator may be covered with well distributed laser light energy, optimizing the absorption of the pumping laser light, thereby improving efficiency of the system. In addition, the distance between the pumping laser diodes and the resonator is increased, reducing the heating of the resonator by the laser diodes. Preferably, the fan-out-covering optical system illuminates at least 90% of the length of the surface of the resonator facing the fan-out-covering optical system (i.e. the percentage of the length of resonator illuminated), more preferably at least 95%, most preferably at least 99%.

Figure 13:
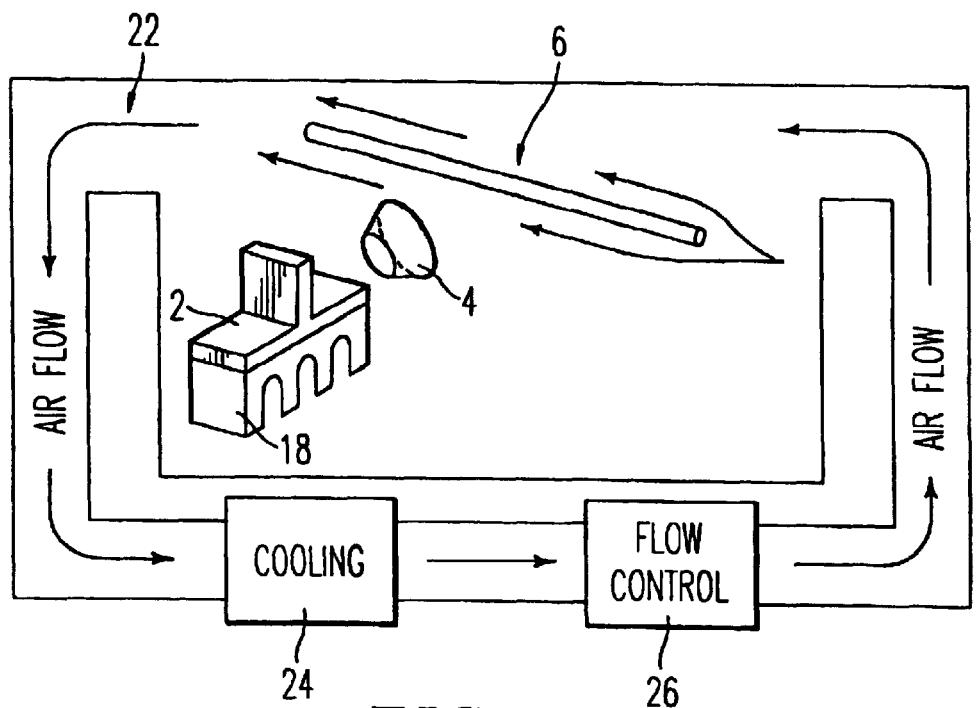
FIG. 13 illustrates a laser of the present invention which includes an air cooling system.

The additional space provided by use of the fan-out-covering optical system allows air cooling, as illustrated in FIG. 13. Laser diode array 2, has an attached heat sink 18 which can be submerged inside the flow path 22, or serve as a wall of the flow path 22 to conduct heat directly to the outside. A thermoelectric cooler can be attached to the heat sink 18 to enhance the cooling of the laser diode array. Between the laser diode array 2, and the resonator 6 is the fan-out-covering optical system 4. Air, or any cooling gas, can be forced to flow around the resonator 6 and around the system along the air flow path 22 illustrated with arrows. The air flow path 22 passes across the resonator 6 to cooler 24 which cools the air. Air flow controller 26 drives the air around the system, and then back around to the resonator 6. The air cooler 24 is preferably a thermoelectric cooler, but may also be a heat pump or other cooling device know to those of ordinary skill in the art. The air flow controller may be as simple as a fan or any device which simply moves air across the resonator. In addition, the air may be compressed, cooled, and then expanded, using a compressor to drive the air flow and the expansion to cool the air. Preferably the air flow is laminar flow.

Figure 14:
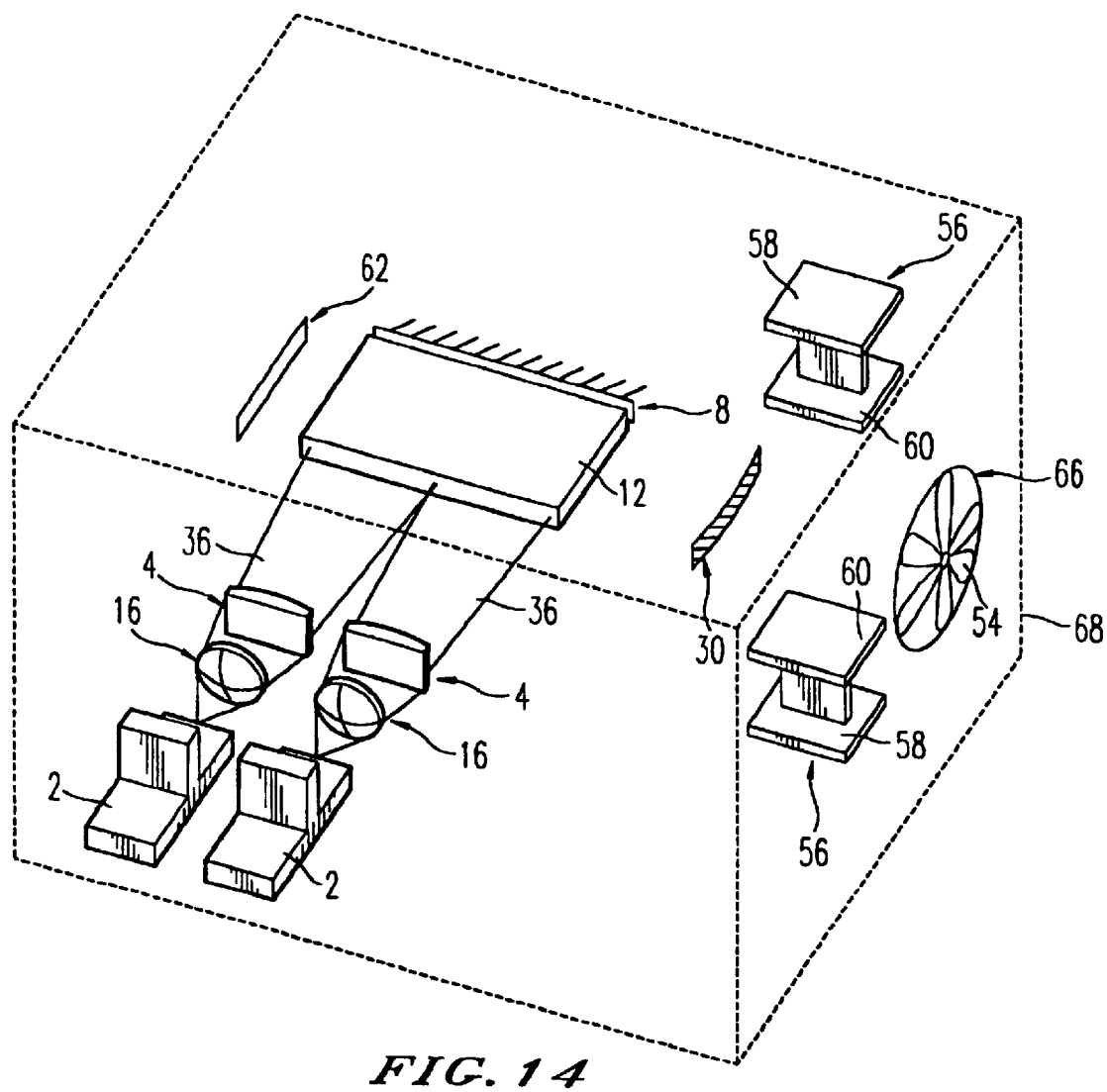
FIG. 14 illustrates an embodiment of the invention including air cooling, thermoelectric cooling and a schematic of the laser system housing.

Less preferred is a system which draws the air from outside the system, across the resonator and then forces the warmed air out of the system. This open system may also have an air cooler which cools the outside air as it enters the system. Such a system is shown in FIG. 14. Here the air flow controller is a fan 54, which pulls outside air in through port 66. Port 66 may be covered with a grill or grate, and may also have a filter for removing dust and particulate matter from the air which enters the housing 68. There air passes between two thermoelectric cooling devices 56 and 56, which together form a cooler. The air is cooled by the cold ends 60 and 60 of the thermoelectric cooling devices, and excess heat is expelled from the hot ends 58 and 58 of the thermoelectric cooling devices. The cool air flows by the resonator 12, and then exits out of the housing 68 (exit not shown). Also included in this figure are partially reflective mirrors 62 and curved mirror 30, which together with the resonator 12 define the resonator cavity. Other elements in this figure correspond to those of FIG. 12. An alternative embodiment would have the fan 54, port 66 and thermoelectric cooler 56 and 56 placed on the side of the housing 68 facing mirror 8, so that the air flows across the resonator 12, passed the fan-out-covering optical systems 4 and 4, and finally over the laser diode arrays 2 and 2. A closed system would be similar, except the air, once it has passed across the resonator 12 would be returned to the fan 54 via a tube or channel.

If the power of the laser is low enough, for example 10 watts or less, the air flow controller may be eliminated, and simple convection will draw outside air in across the resonator for cooling. Preferably, however, the laser output is at least 10 watts including 10–1000 watts, more preferably at least 15 watts, including 15–500 watts, most preferably at least 20 watts, including 20–200 watts.

The use of air cooling eliminates the need for water cooling. cooling of the laser diode arrays can be accomplished with a heat sink and/or a thermoelectric cooler. Since the air used to cool the resonator can itself be cooled with a thermoelectric cooler, a cooling system can be used which eliminates the need for water cooling, even with a high power laser. The resonator may be solely air cooled, or mainly air cooled. Mainly air cooled means that 50% or more of the heat removed from the resonator is transferred to air (or other cooling gas) which is in contact with the resonator. In the present invention, it is also possible to solely cool the laser diode arrays by air cooling, or the laser diode arrays may be mainly air cooled. Finally, the air cooling of the present invention is preferably active air cooling, i.e. the air is itself cooled prior to contacting the resonator or laser diode arrays. This is different from passive air cooling, which may only move the air, but not actively remove heat from it.

The main factor which controls the stability of the laser source is the temperature distribution inside the source, especially within the resonator. The present invention may use an air cooler (such as a heat sink and a cascaded thermoelectric cooler) to cool the air as it flows through the laser diode pumped solid state laser. The fan-out-covering optical system allows additional space to be placed between the laser diode arrays and resonator, providing space for air cooling, as well as the inclusion of a heat sink and cascaded thermoelectric cooler. The resonator may be enclosed in a closed loop wind tunnel with separate air cooling and flow controller sections. One or more nozzles can be included in the air path, to control the flow rate. In a further variation, the air cooler and flow controller can physically be in the same location. The air along the flow path can be expanded, through a nozzle, to cool the air. The air cooler and air flow controller could also be combined into a single device, for example, a compressor for compressing the air with a nozzle for expanding the air, so that its temperature after exit is lower than prior to compression. The flow control, along with the air cooler, allows a uniform temperature distribution within the resonator. Better thermostability is achieved, yet without using a cooling liquid such as water. A preferable temperature profile for the resonator will have a difference between the coolest and hottest portion of the resonator of at most 10° C., more preferably at most 5° C., even more preferably 1° C., and most preferably 0.1° C., after 1 minute, preferably 10 minutes, more preferably after 1 hour, of operation.

Figure 7:
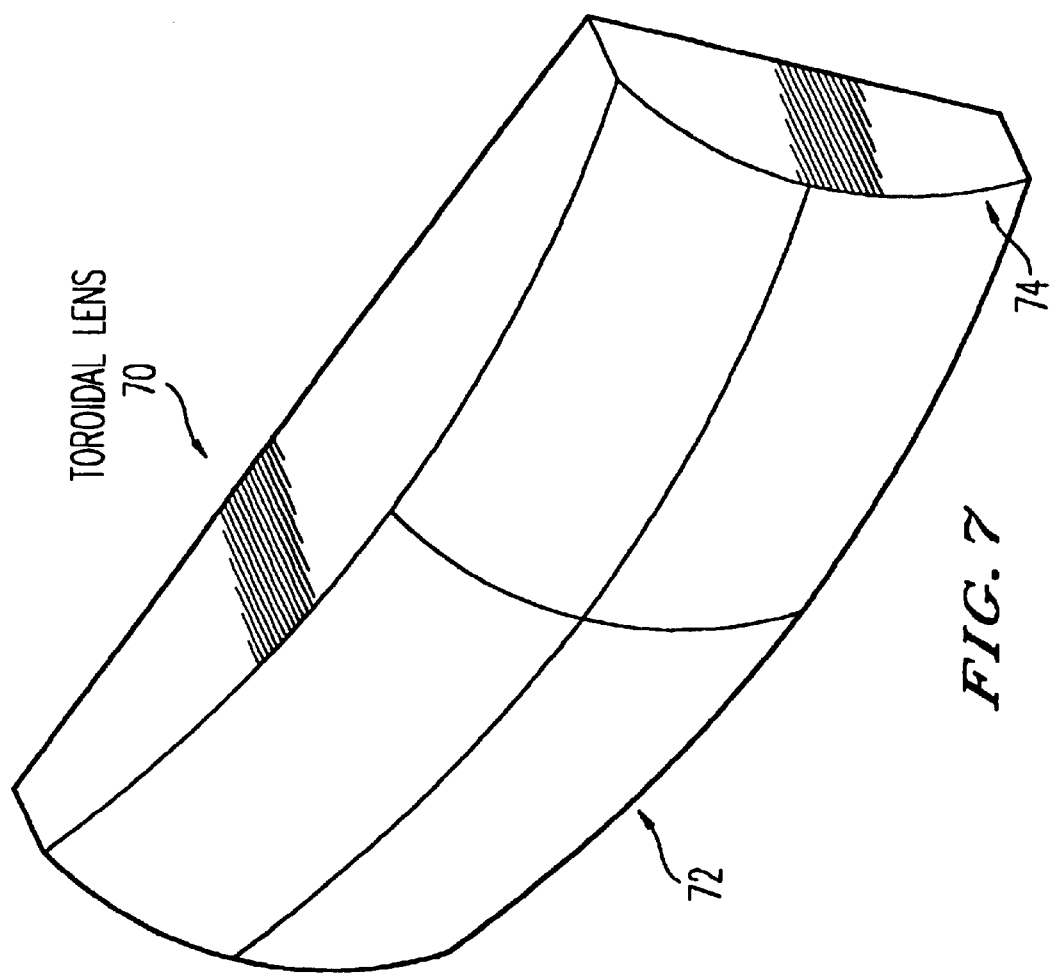
FIG. 7 illustrates a toroidal lense.
Figure 16:
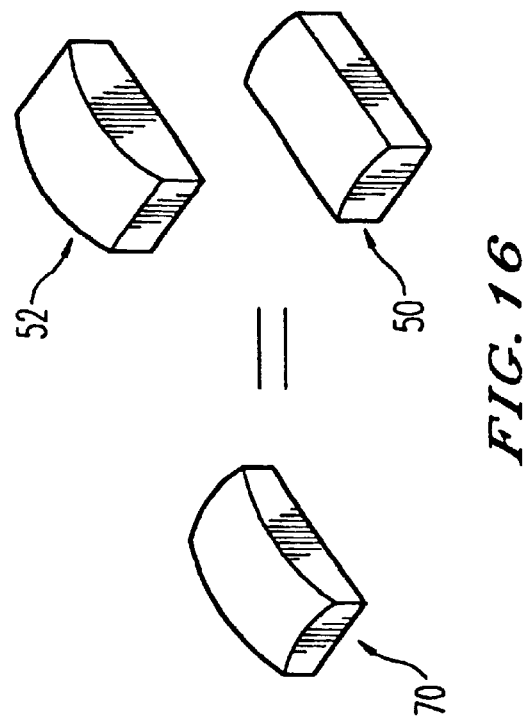
FIG. 16 illustrates the equivalence between two cylindrical lenses and a single toroidal lense.

A fan-out-covering optical system may be formed from a variety of different elements as illustrated in FIGS. 7, 15 and 16. For example, two convex cylindrical lenses, one horizontal 50 and one vertical 52, can be used to form the fan-out-covering optical system as illustrated in FIG. 16. A single toroidal lense 70 is equivalent to the two cylindrical lenses, and can be used for the fan-out-covering optical system. A toroidal lense, as shown in FIG. 7, has a horizontal curve 72 and a vertical curve 74, which have different curvatures. For use in the fan-out-covering system, the curvature of the horizontal curve is smaller than the curvature of the vertical curve. Another example of a fan-out-covering system 4, is illustrated in FIG. 15, and contains a horizontal concave cylindrical lense 48, a vertical convex cylindrical lense 50, and a horizontal convex cylindrical lense 52.

A fan-out-covering system may also be constructed using shaped mirrors or a combination of mirrors and lenses. Holograms may also be used for the fan-out-covering system, but must be made out of a material that can tolerate the high energy of the laser diode arrays, such as glass or a heat-resistant polymer.

The air cooling system of the present invention is much more compact than cooling systems used in the past. The resonator my be cooled solely by air, and the only cooling devices in the system may be thermoelectric coolers and air flow. The housing which encloses the resonator and the laser diode arrays is a little larger systems used in the past, because there is about 1 to 2 inches of space between the resonator and the diode laser arrays. However, the total size of the device, including the cooling system, is dramatically smaller.

The whole air flow path and/or only the flow control section may be a simple tube, or a collection of straw like tubes. These tubes may be made from a metal, and cooled by a thermoelectric cooler, combining the air cooler and the air flow controller. Additional collections of straws or tubes can be used to adjust the rate of flow and flow path of air through the system, or even to smooth the air flow to help maintain laminar flow. The flow rate of air through the system is adjusted so that the temperature profiles described above are maintained.

The present invention provides excellent beam quality. In the $TEM_{00}$ mode, the laser beam has a cross sectional energy distribution which is gausian. Higher modes are sometimes easier to produce, and typically a laser will produce a mixture of modes, which is acceptable for most applications. A loss of beam quality results, however, when the characteristics of the beam change with time. For example, the energy profile of the beam may change with time. Thermal lensing resulting from an uneven temperature profile of the resonator, can affect the direction in which the laser beam points, as well as the spot size (cross sectional shape and area) of the beam. These adverse affects are dramatically reduced in the present invention. Preferably, the spot size changes by at most 10%, more preferably by at most 5%, even more preferably by at most 1%, and most preferably by at most 0.1%, over the course of 10 minutes, after one hour of operation. The change in pointing direction over a period of time is measured by finding the two points farthest away from each other in a plane perpendicular to the average direction of the beam. The angle formed by the two points and the closest end of the resonator is a measure of the change in pointing direction. Preferably, the pointing direction changes by at most 10 seconds (10=60 minutes=3600 seconds), more preferably by at most 2 seconds, most preferably by at most 0.5 seconds, over the course of 10 minutes after 15 minutes of operation.

Any solid state lasing material may be used for the resonator. Examples include those described in "Lasers (Coherent Sources)", J. E. Miller and D. J. Horowitz, *Electronics Engineers' Handbook*, $3^{rd}$ Edition, D. G. Find and D. Christiansen, ed.,, on page 11-21, table 11-6.

Thermoelectric cooler are well known to those of ordinary skill in the art, and are commercially available.

The laser of the present invention can be used in any device which requires a laser. A preferred device is a printer, such as a dye or thermal wax printer. The printers work by using a laser beam to heat a dye or thermal wax, thereby transferring it to a receiving sheet, for example, by sublimation. This allows for very high quality color reproduction, such as is necessary in digital photograph printing. Other uses include lasers for medical application, for example laser surgery.

Obviously, numerous modifications and variations of the present invention are possible in light of the above teachings. It is therefore to be understood that within the scope of the appended claims, the invention may be practiced otherwise than as specifically described herein.

The priority document of the present application, provision application Ser. No. 06/025,889, pending, filed in the United States on Sep. 10, 1996, is hereby incorporated by reference. All other citations in this application are also hereby incorporated by reference.

What is claimed as new and is desired to be secured by Letters Patent of the United States is:

1. A solid state laser, comprising:
   (a) a resonator, (b) at least one laser diode array for side pumping said resonator, and
   (c) at least one fan-out-covering optical system, between said resonator and said at least one laser diode array.

2. The solid state laser of claim 1, further comprising:
(d) an active air cooler.
3. The solid state laser of claim 1, further comprising:
(d) an air flow controller.
4. The solid state laser of claim 1, comprising:
(b) at least two laser diode arrays for side pumping said resonator.
5. The solid state laser of claim 1, wherein (c) said fan-out-covering optical system comprises a toroidal lense.
6. The solid state laser of claim 1, further comprising:
(d) at least one collimating optics, between said at least one laser diode and said at least one fan-out-covering optical system.
7. The solid state laser of claim 3, comprising:
(b) at least two laser diode arrays for side pumping said resonator, and further comprising
(e) an active air cooler,
wherein (c) said fan-out-covering optical system comprises a toroidal lense, and
said solid state laser has an output power of at least 20 W.
8. The solid state laser of claim 7, wherein (a) said resonator is mainly air cooled, and
(e) said air cooler comprises a thermoelectric cooler.
9. A solid state laser, comprising:
(a) a resonator,
(b) a laser diode array for side pumping said resonator,
(c) an active air cooler, and
(d) an air flow controller.
10. The solid state laser of claim 9, comprising:
(b) at least two laser diode arrays for side pumping said resonator.
11. The solid state laser of claim 9, wherein (c) said air cooler comprises a thermoelectric cooler.
12. The solid state laser of claim 9, wherein (a) said resonator is solely air cooled.
13. A method of generating a laser beam, comprising:
generating laser light from at least one laser diode array; and
passing said laser light through at least one fan-out-covering optical system, thereby side pumping a resonator.
14. The method of claim 13, further comprising:
moving cooled actively air across said resonator.
15. The method of claim 13, wherein said fan-out-covering optical system comprises a toroidal lense.
16. The method of claim 13, further comprising:
passing said laser light through at least one collimating optics, before passing said laser light through at least one fan-out-covering optical system.
17. The method of claim 14, wherein said resonator is mainly air cooled, and
said air is cooled with a thermoelectric cooler.
18. A method of generating a laser beam, comprising:
generating laser light from at least one laser diode array;
side pumping a resonator with said laser light; and
moving cooled actively air across said resonator.
19. The method of claim 18, wherein said air is cooled with a thermoelectric cooler.
20. The method of claim 18, wherein said resonator is solely air cooled.
21. The solid state laser of claim 3, wherein said air flow controller comprises at least one member selected from the group consisting of a nozzle, a compressor and a fan.

22. The solid state laser of claim 9, wherein said air flow controller comprises at least one member selected from the group consisting of a nozzle, a compressor and a fan.
23. The method of claim 14, wherein said cooled air is moved by an air flow controller comprises at least one member selected from the group consisting of a nozzle, a compressor and a fan.
24. The method of claim 18, wherein said cooled air is moved by an air flow controller comprises at least one member selected from the group consisting of a nozzle, a compressor and a fan.
25. The solid state laser of claim 1, comprising:
(b) at least first and second laser diode arrays for side pumping said resonator simultaneously from opposite sides,
wherein said first laser diode arrays emit a first frequency of light,
said second laser diode arrays emit a second frequency of light,
said first and second frequencies of light are different,
said resonator comprises a first side facing said first laser diode array and a second side facing said second laser diode array,
said second side is coated with a V-coating for reflecting said first frequency of light, and
said first side is coated with a V-coating for reflecting said second frequency of light.
26. The solid state laser of claim 9, comprising:
(b) at least first and second laser diode arrays for side pumping said resonator simultaneously from opposite sides,
wherein said first laser diode arrays emit a first frequency of light,
said second laser diode arrays emit a second frequency of light,
said first and second frequencies of light are different,
said resonator comprises a first side facing said first laser diode array and a second side facing said second laser diode array,
said second side is coated with a V-coating for reflecting said first frequency of light, and
said first side is coated with a V-coating for reflecting said second frequency of light.
27. The method of claim 13, wherein light is generated from at least first and second laser diode arrays,
said resonator is simultaneously pumped from opposite sides by said first and second laser diode arrays,
said first laser diode arrays emit a first frequency of light,
said second laser diode arrays emit a second frequency of light,
said first and second frequencies of light are different,
said resonator comprises a first side facing said first laser diode array and a second side facing said second laser diode array,
said second side is coated with a V-coating for reflecting said first frequency of light, and
said first side is coated with a V-coating for reflecting said second frequency of light.
28. The method of claim 18, wherein light is generated from at least first and second laser diode arrays,
said resonator is simultaneously pumped from opposite sides by said first and second laser diode arrays,
said first laser diode arrays emit a first frequency of light, said second laser diode arrays emit a second frequency of light, said first and second frequencies of light are different, said resonator comprises a first side facing said first laser diode array and a second side facing said second laser diode array, said second side is coated with a V-coating for reflecting said first frequency of light, and said first side is coated with a V-coating for reflecting said second frequency of light.

* * * * *